Aug. 8, 1933.  W. H. RICE ET AL  1,921,943
SCREENED VENT CAP
Filed Jan. 6, 1932

Inventors
W. H. Rice.
H. M. Lyon.
By Lacey & Lacey, Attorneys

Patented Aug. 8, 1933

1,921,943

UNITED STATES PATENT OFFICE 1,921,943

SCREENED VENT CAP

William H. Rice and Hancel M. Lyon, Atlanta, Ga.

Application January 6, 1932. Serial No. 585,134

6 Claims. (Cl. 220—44)

This invention relates to storage tanks and containers such, for instance, as are employed at gasoline dispensing stations and storage plants to hold the supply of liquid, and the object of the invention is to provide ventilation to permit the volatile fumes to escape and also to provide means whereby insects and foreign matter will be prevented from obtaining access to the stored commodity. Other objects of the invention will appear incidentally in the course of the following description and the invention resides in certain novel features which will be particularly defined in the appended claims.

Figure 1:
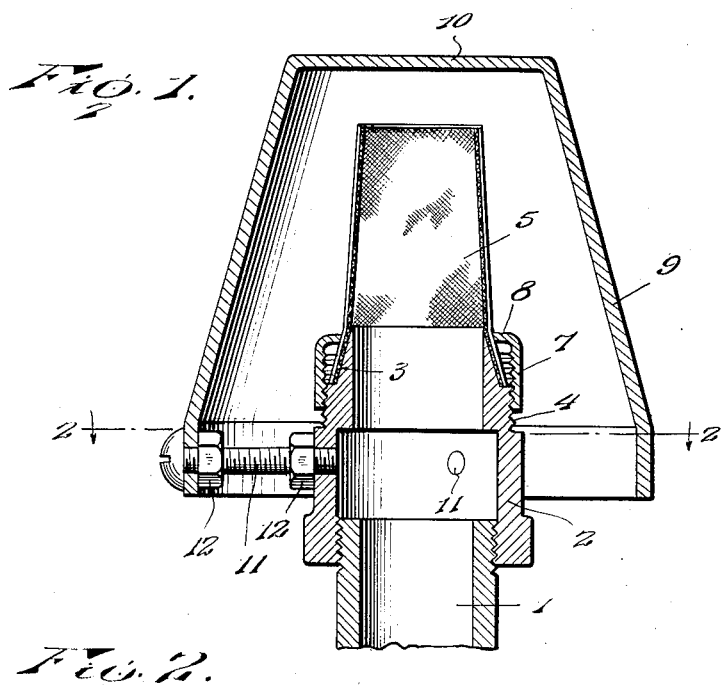
Figure 2:
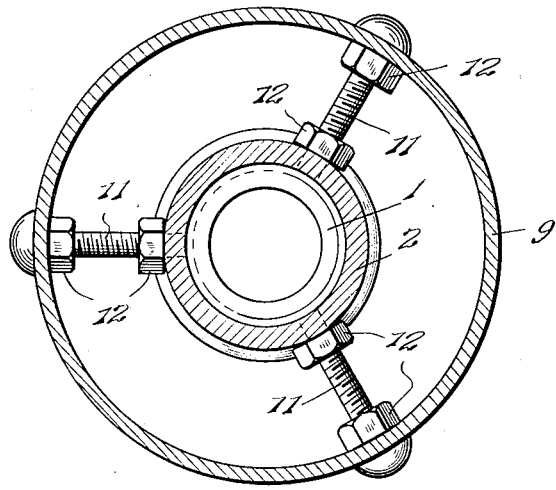
Figure 3:
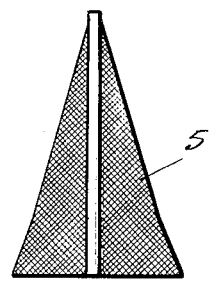

In the accompanying drawing, Fig. 1 is a vertical section of a vent cap embodying the invention, Fig. 2 is a horizontal section on the line 2—2 of Fig. 1, Fig. 3 is a detail elevation of the screen.

The reference numeral 1 indicates the upper end of a vent pipe which leads from the tank and may be of any desired dimensions. In carrying out the present invention, there is fitted upon the upper end of the vent pipe a coupling sleeve 2 which is preferably provided, at its lower end, with internal threads engaging external threads upon the vent pipe whereby the parts may be easily assembled and just as easily separated when cleaning is considered desirable. The upper extremity of the sleeve 2 is externally tapered, as shown at 3, and immediately below the tapered extremity is provided with external threads 4. A tubular screen 5, which may be of any approved form and is preferably tapered and flattened at one end, as shown clearly in Fig. 3, and consists of fine mesh wire netting, is fitted upon the upper end of the sleeve 2, as shown in Fig. 1. The wire netting body of the screen is flared preferably in a circular form at its lower wider end corresponding to the tapered extremity of the sleeve so that it will fit snugly thereover, as shown in Fig. 1. A retaining collar or cap, shown at 7 and consisting of an annular body having screw threads on its inner circumference to engage the screw threads 4 on the sleeve whereby it may be drawn into secure engagement with the sleeve, is provided and, at its upper end is formed with an inwardly directed flange 8 which, as shown, bears against the screen. As the retainer is turned home upon the sleeve, the screen will be drawn downwardly on the sleeve and will effect a very firm and close seat upon the tapered extremity of the sleeve, as will be understood.

Around the sleeve and the screen is a cap or cover 9 which is tapered upwardly and is closed at its upper end, as shown at 10. The lower end of this cap is open so that it may be easily placed in position over the screen and the vent and in its lower margin is provided with openings through which screws 11 may be inserted to engage, at their inner ends, with internally threaded openings provided therefor in the sleeve 2. The screws 11 serve to mount the cap concentric with the sleeve and in spaced relation thereto and support it from the cap, and lock nuts 12 are preferably provided upon these supporting and securing screws to be turned home against the outer surface of the coupling sleeve and the inner surface of the cap so that the parts will be locked in place. It will be noted that inasmuch as the screen 5 is tapered upwardly and extends over and above the upper end of the coupling sleeve, said screen not only prevents insects from entering the vent pipe but also serves as a barrier or deflector for directing insects striking thereagainst downwardly between the screen and cap and out through the open end of said cap. It will further be noted that by adjusting the screws 11 the cap may be centered in spaced relation to the coupling sleeve so that said screws not only serve to connect the cap and coupling but also permit adjustment of one relative to the other.

From the foregoing description, taken in connection with the accompanying drawing, it will be readily seen that we have provided a very simple structure whereby the entrance of insects into a vent pipe and through the pipe into a storage tank will be positively prevented while ample ventilation for the escape of fumes will be afforded. The cap is of such form that it prevents the entrance of rain or other foreign matter to the vent pipe and provides an extensive open area between the cap and the vent so that insects cannot lodge therein and obstruct the circulation of air so as to interfere with the proper and desired ventilation. When cleaning or replacement of the screen is desired, the separation of the parts can be very easily and quickly effected and the assembling of the parts, after cleaning or repairing, may be just as easily accomplished.

Having thus described the invention, we claim:

1. A device for the purposes set forth comprising a coupling sleeve to be secured on the end of a vent pipe, a screen fitted about the free end of the sleeve, means for securing the screen upon the sleeve, a cap having a closed upper end and an open lower end disposed about the sleeve and the screen in spaced relation thereto, supporting screws inserted through the lower margin of the cap and engaged in the sleeve to support the cap in spaced relation to the sleeve, and lock nuts mounted on said screws and turned home against the sleeve and the cap respectively.

2. A ventilating device comprising a coupling adapted to be connected with the end of a vent pipe, an upwardly tapered perforated screen fitting entirely around and extending above and over the upper end of the coupling and forming a deflector, and a retainer mounted on the coupling and engaging the screen whereby to hold it firmly on the coupling.

3. A ventilating device comprising a coupling adapted to be connected with the end of a vent pipe, an upwardly tapered screen fitting over and extending above the upper end of the coupling and forming a deflector, a retainer mounted on the coupling and engaging the base of the screen, and a cap fitted over the screen and having its upper end closed and its lower end open and spaced from the coupling.

4. A ventilating device comprising a coupling adapted to be connected with the end of a vent pipe, a screen fitting over and extending above the upper end of the coupling, a cap fitted over the screen and having its upper end closed and its lower end open, and means connecting the open end of the cap with the coupling and serving to maintain said cap in spaced relation to the coupling, said screen being tapered upwardly and constituting a deflector for directing insects downwardly through the open end of the cap.

5. A ventilating device comprising a coupling adapted to be connected to the end of a vent pipe, a screen fitting over and projecting above the upper end of the coupling, a cap fitted over the screen and having its upper end closed and its lower end open, and fastening devices forming a connection between the open end of the cap and said coupling, said fastening devices being adjustable to center the cap with respect to the coupling.

6. A ventilating device comprising a coupling adapted to be connected with the end of a vent pipe and having its upper end tapered, an upwardly tapered screen fitted over and extending above the upper end of the coupling and having its lower end flared laterally for engagement with the tapered end of the coupling, and a retaining member fitted on the coupling and provided with an inwardly extending flange adapted to bear against the flared portion of the screen for clamping said screen in contact with the coupling.

WILLIAM H. RICE. [L. S.]
HANCEL M. LYON. [L. S.]